No. 648,408. Patented May 1, 1900.
W. HAYES.
SELF PUMPING PNEUMATIC VEHICLE WHEEL.
(Application filed Mar. 14, 1900.)
(No Model.)
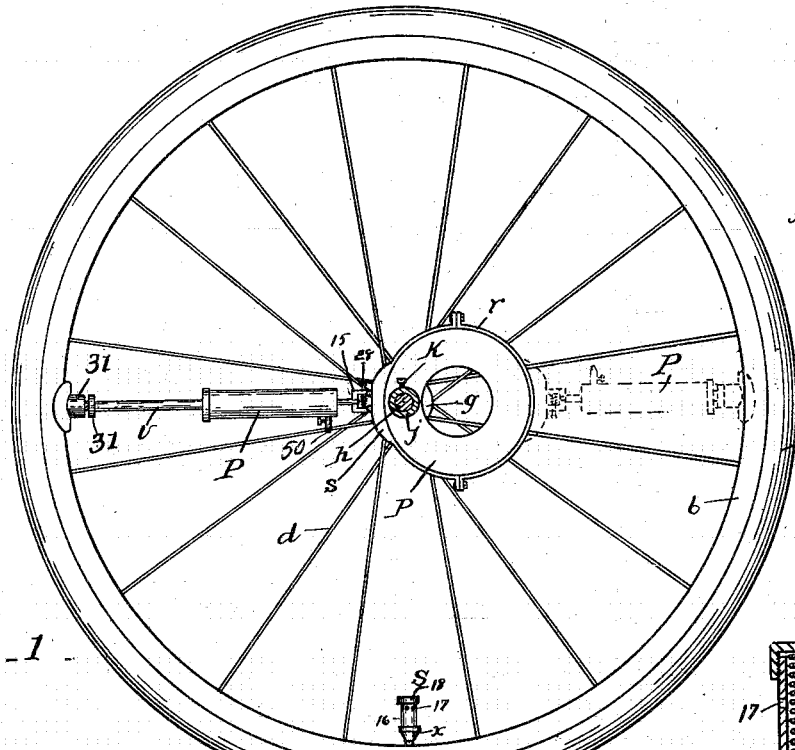
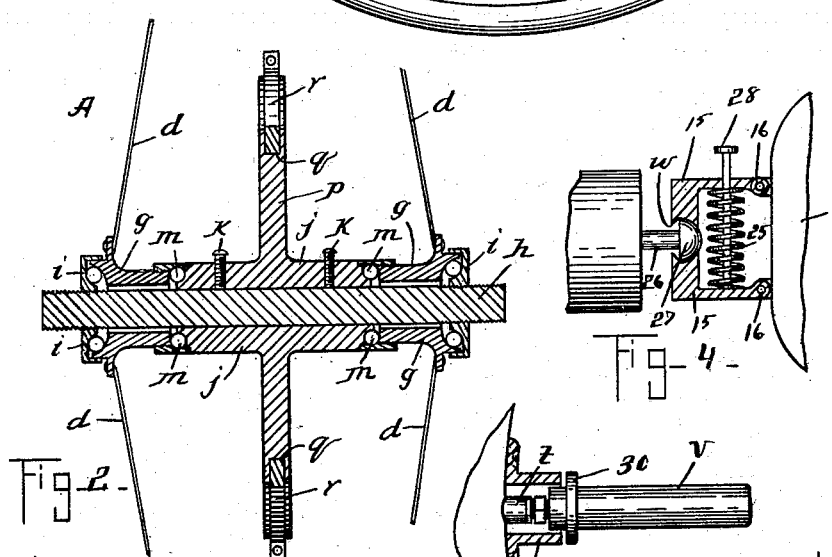
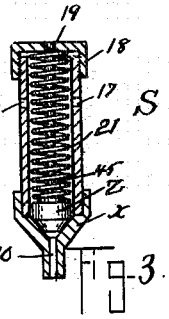
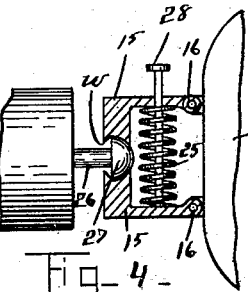
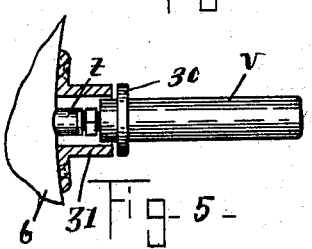
Witnesses:
H. B. Davis.
W. J. Hayes
Inventor:
William Hayes

UNITED STATES PATENT OFFICE.

WILLIAM HAYES, OF BOSTON, MASSACHUSETTS.

SELF-PUMPING PNEUMATIC VEHICLE-WHEEL.

SPECIFICATION forming part of Letters Patent No. 648,408, dated May 1, 1900.

Application filed March 14, 1900. Serial No. 8,683. (No model.)

*To all whom it may concern:*

Be it known that I, WILLIAM HAYES, of Boston, in the county of Suffolk and State of Massachusetts, have made certain new and useful Improvements in Self-Pumping Pneumatic Vehicle-Wheels, of which the following is a description sufficiently full, clear, and exact to enable any person skilled in the art or science to which said invention appertains to make and use the same, reference being had to the accompanying drawings, forming part of this specification, in which—

Figure 1 is a side elevation of an ordinary bicycle-wheel provided with a pneumatic tire and showing my automatic pumping attachment in position; Fig. 2, a vertical longitudinal section of the same through the axle; Fig. 3, a vertical section of the relief-valve; Fig. 4, a sectional view enlarged showing method of attaching pump-body to cam-ring, and Fig. 5 a like view showing tire-valve guard and pump-piston connected.

Like letters and numerals of reference indicate corresponding parts in the different figures of the drawings.

My invention relates especially to an automatic pumping device attachable to the wheel of a bicycle or other vehicle on which pneumatic tires are employed, whereby at each revolution of said wheel air may be forced into said tire.

The object of the invention is particularly to equip vehicles of this class with a simple, cheap, and effective device whereby a constant determined air-pressure may be maintained in the tire and whereby also the tire may be maintained inflated even when accidentally punctured, or at least sufficiently so as to prevent absolute deflation, which would necessitate dismounting.

The nature and operation of the improvement will be readily understood by all conversant with such matters from the following explanation.

In the drawings, A represents the wheel considered as a whole, $b$ the rim, $c$ the tire, and $d$ the spokes, these parts being all of the ordinary form and arrangement. The spokes are held in flanged hubs $g$ on the axle $h$; but instead of said hubs being joined in one piece, as is usual in such wheels, they are separate, as shown in Fig. 2, to admit my device being mounted on said axle between the two sets of spokes, which said hubs respectively bear. On said axle between said hubs I secure a sleeve $j$ by set-screws $k$. The ends of this sleeve are channeled to form ball-races, in which balls $m$ travel and act as roller-bearings for the ends of the wheel-hubs $g$, against which they are set up in the usual manner by the check-nuts $i$. Integral with this sleeve $j$ and in the vertical plane of the wheel an eccentrically-arranged cam $p$ is formed. As thus constructed this cam is eccentric of and stationary on the axle $h$. The rim of this cam is grooved at $q$, and fitted to work smoothly in said groove by means of ball-bearings or other suitable devices there is an annulus or circular strap $r$.

The usual flexible pump-nipple $t$, Fig. 5, protrudes through rim $b$ from tire $c$, and to this the hollow piston $v$ of an ordinary bicycle air-pump P is secured. Secured to the rim $b$ around this nipple there is a guard 31, tubular and of sufficient diameter to loosely admit piston $v$ of the pump. On said piston is formed a flange 30 to check end thrust of the pump, the guard acting also as a guide, and thus prevent distortion of the rubber or elastic nipple and the consequent danger of leakage. The body of the pump is pivotally connected to a boss 5 on the strap $r$. This connection is made by a ball-and-socket joint, the socket $w$ being formed by two members 15 of a clamp hinged at 16 to said boss. A stiff pull-spring 25 connects the clamp members. A rigid pin 26 projects longitudinally from the pump-body and has a ball 27 on its outer end which seats in said socket. A pin 28 is fitted to slide through one clamp member and is engaged with the companion member, so that by pushing said pin inward the members may be spread outward and the socket $w$ opened to release the ball. Said pump being of commonest and generally-known construction, it is not deemed essential to particularly describe the same herein. Said pump arranged as described is radial of the axle $h$.

As the wheel A is rotated in use the pump P is carried with it and conjointly moves the ring-strap $r$ on the cam $p$. Said cam being eccentric of and rigid on the stationary axle $h$, the pump-body is caused to continuously reciprocate on its piston $v$, attached to the wheel-rim. Air is thereby constantly forced into the tire $c$ at each revolution of the wheel in a manner which will be readily understood by those conversant with such matters without a more explicit description.

Of course as the wheel rotation is very rapid the tire is quickly inflated to its capacity. To prevent exceeding this point and thereby exploding the tire, I equip the wheel with a relief or safety valve $s$. This valve (shown in detail in Fig. 3) consists of a screw-nipple which taps tire $c$ through rim $b$. In this nipple is formed a conical valve-seat which is engaged by a loose conical valve $z$, normally closing the inlet 20 of the nipple. A cylindrical body screws into said nipple and contains the valve, the outer end of said body being closed by a screw-cap 18, having a vent 19. Said body is also provided with a series of vents 17. The stem 45 of the valve is elongated and nearly touches the cap 18 when the valve is seated. This stem is encircled by a specially-wound spring 21, which is compressed against the valve by said screw-cap. This spring is of known resistance and is gaged by the amount of air-pressure to the inch it is desired to inflate the tire with. As soon as such degree of pressure is attained in the tire the valve $z$ will be forced from its seat against the resistance of the spring 21. The air will thus be permitted to enter the valve-body and escape by the vents 17 and 19 until the pressure in the tire is reduced to the desired degree. By this means it will be seen that a normal pressure of a predetermined force may be constantly maintained in the tire, even in cases where an accidental puncture occurs.

It will be understood that this device is applicable for use on wheels of any description whereon an inflatable tire is employed.

As the pump in use might run dry on its piston, the guard 31 and flange $x$ are essential to preserve the nipple. It is also essential that the pump-body be pivotally connected to the cam-ring, as described, to compensate in large measure for lateral thrust caused by the movement of the cam should it run hard in the ring. Moreover, it is frequently essential that the pump be dismounted. The spreading-clamp shown admits this readily, as so soon as the pump-body is freed the piston can be easily unscrewed from the nipple. I also provide pump-body P with a cock 50, which when opened will throw said pump out of action.

Having thus described my invention, what I claim is—

1. The combination in a bicycle-wheel of the frame and fixed axle: the sleeve detachably secured against rotation on said axle: the flanged hubs $g$ loose on said axle: the ball-bearings between the ends of said hubs and sleeve: the cam $p$ integral with said sleeve: the ring $r$ working in the periphery of said cam and in the vertical plane of said wheel: the spokes rim and tire: the pump having its body pivotally connected to said ring and its piston connected to the flexible nipple of said tire all being arranged to operate, substantially as described.

2. The wheel in combination with the cam and its ring: the pump-body: the hinged clamp members on said ring forming a socket: and a projection on said pump-body pivoting in said socket, substantially as and for the purpose specified.

3. The wheel provided with the pneumatic tire and flexible nipple in combination with the guard on the wheel-rim surrounding said nipple: the pump provided with the flange on its piston for engaging said guard and devices for actuating said pump by the rotation of said wheel, substantially as described.

4. In a device of the character described the cam and ring in combination with the spring-held clamp members, 15, hinged to said ring and forming socket, $w$; the pin for spreading said members; the pump; and a projection on said pump adapted to be detachably seated in said socket, substantially as described.

In testimony whereof I have signed my name to this specification in the presence of two subscribing witnesses.

WILLIAM HAYES.

Witnesses:
WILLIAM J. HAYES,
JOHN H. HOPWOOD.